Sept. 15, 1964     J. B. PLATNER ET AL     3,148,669
EXHAUST GAS HEATED SYSTEM FOR ENGINE INTAKE MANIFOLD
Filed June 13, 1960     4 Sheets-Sheet 3
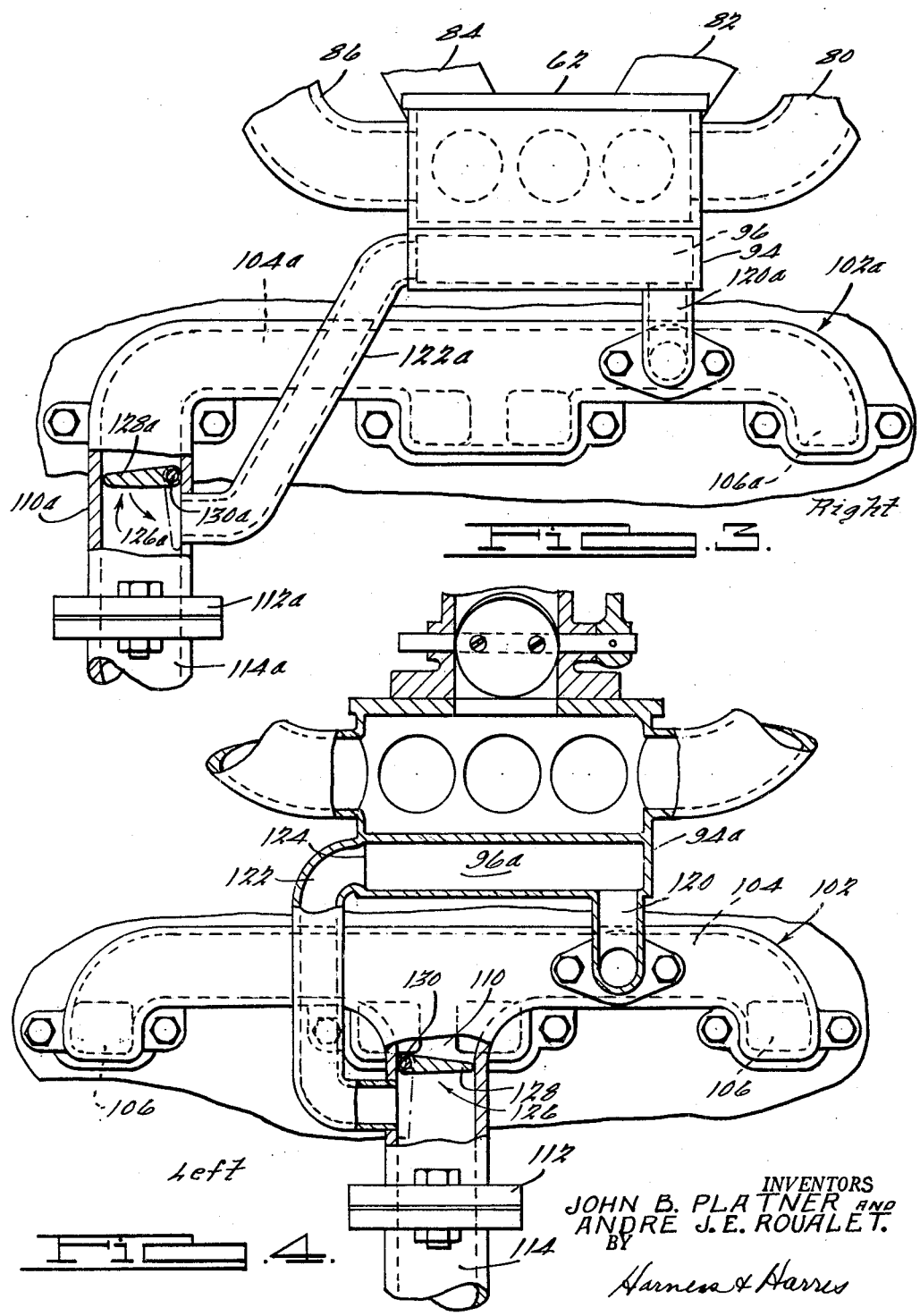
INVENTORS
JOHN B. PLATNER AND
ANDRE J. E. ROUALET.

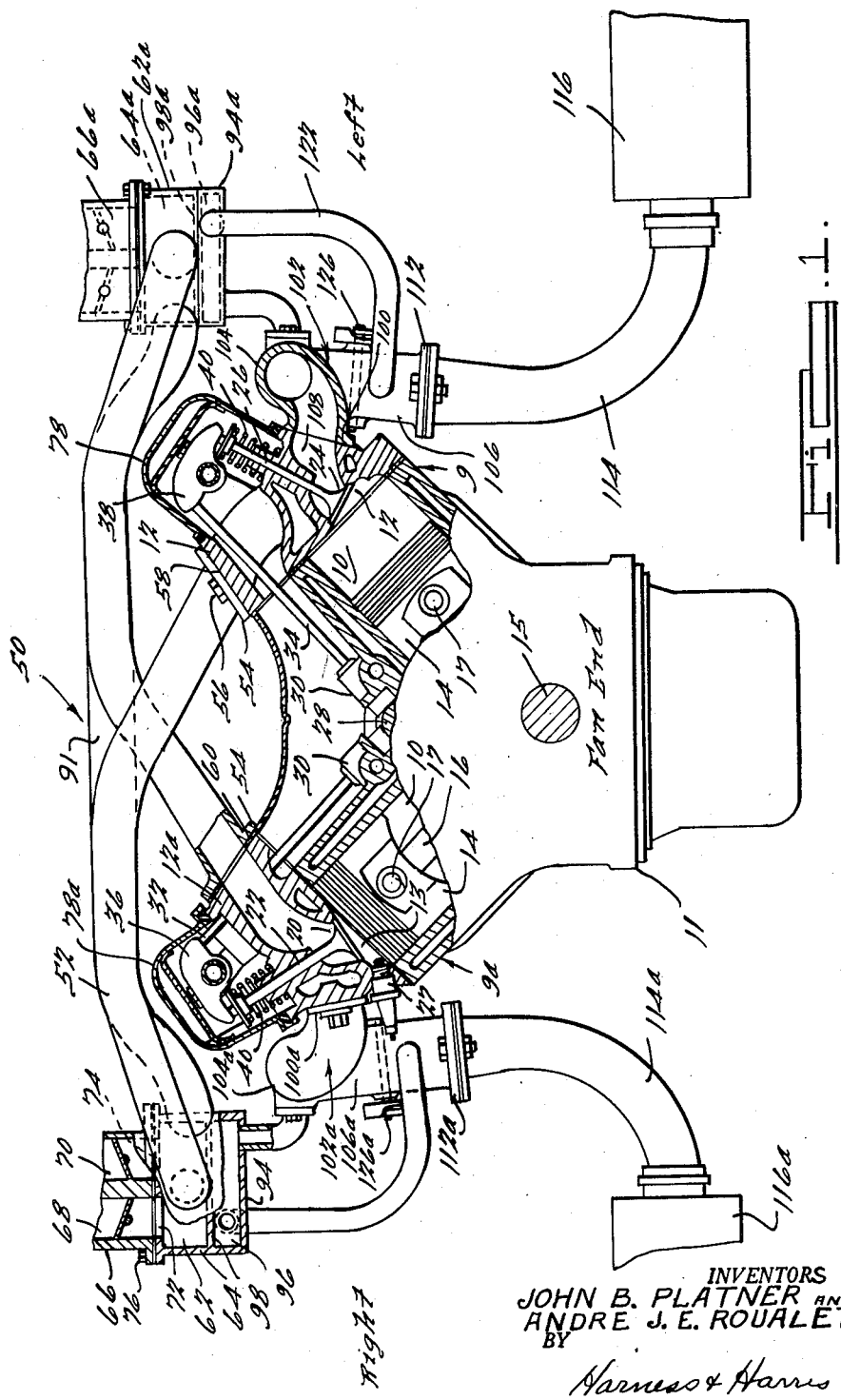

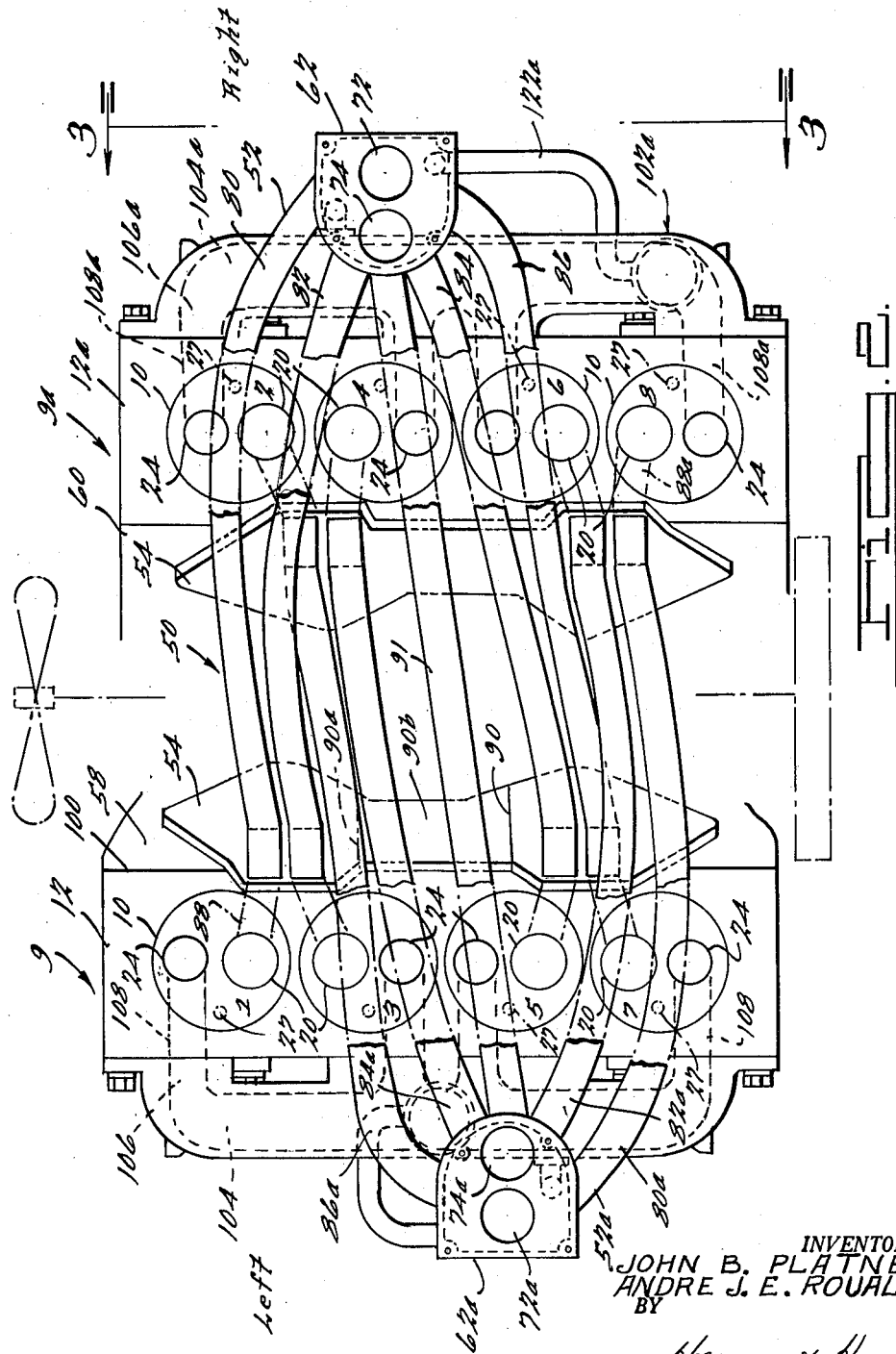

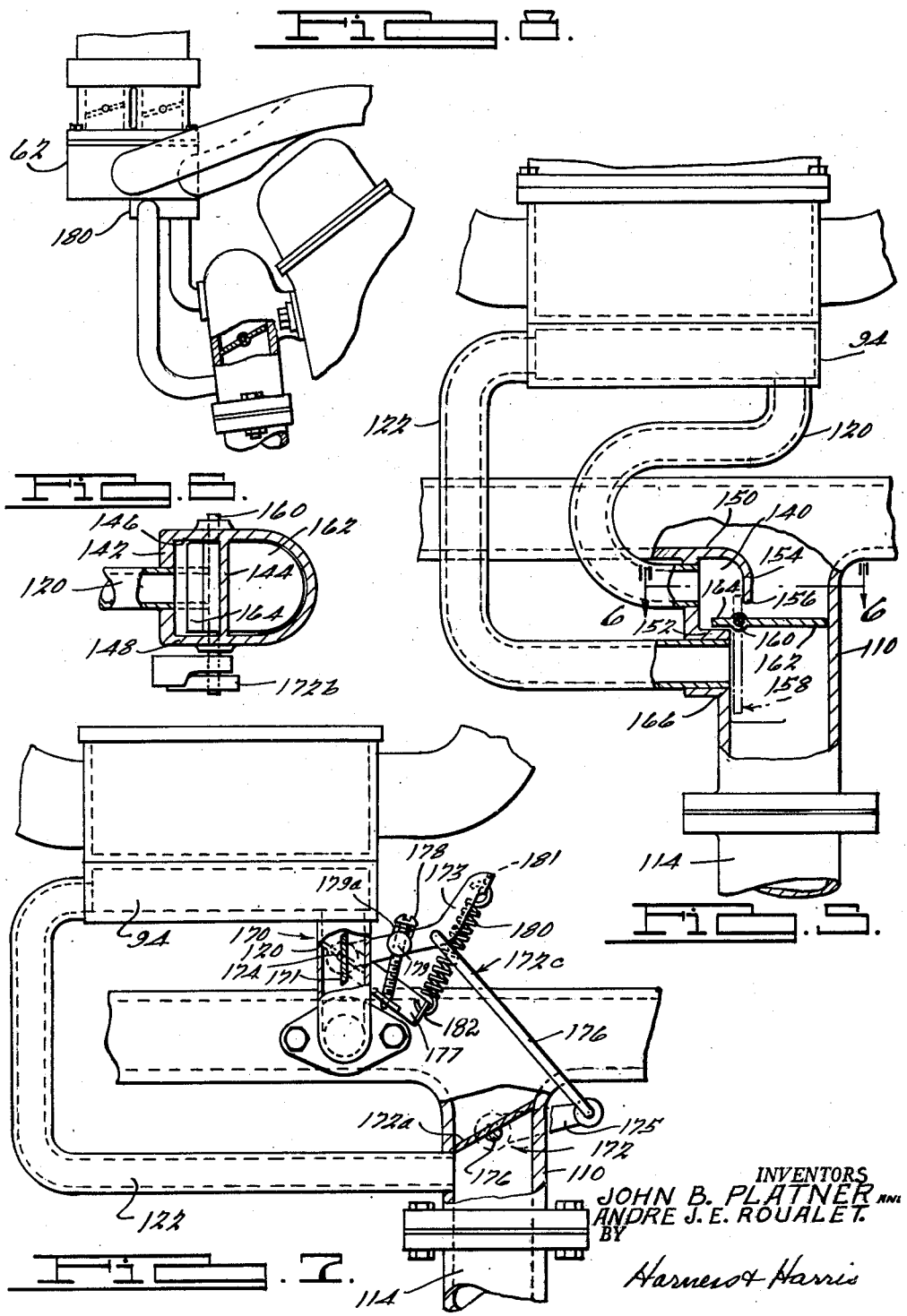

United States Patent Office 3,148,669
Patented Sept. 15, 1964

3,148,669
EXHAUST GAS HEATED SYSTEM FOR ENGINE INTAKE MANIFOLD
John B. Platner, Detroit, and Andre J. E. Roualet, Birmingham, Mich., assignors to Chrysler Corporation, Highland Park, Mich., a corporation of Delaware
Filed June 13, 1960, Ser. No. 35,634
19 Claims. (Cl. 123—122)

This invention relates to internal combustion engine intake systems provided with exhaust gas heating means for heating the charge prior to delivery to the cylinders of the engine and to exhaust gas heating systems for effecting this result. It particularly relates to heating systems of this type for V engines.

In currently made V engines for passenger vehicles it has been customary to provide an intake manifold intermediate the opposite cylinder banks of the engine with one or more carburetor sources of air-fuel mixture for charging the cylinders and to provide a hot spot on the intake manifold to heat a portion of the intake manifold passage system with exhaust gases caused to flow between the exhaust manifolds of the opposite banks through passages in the cylinder heads connecting therewith and with the intake hot spot.

The present invention is particularly concerned with an air ram type intake system for V engines having opposite outboard carburetor fed plenum chamber sources of air-fuel mixture, one positioned outboard of one cylinder bank and the other outboard of the opposite bank, each provided with a hot spot whereby the charge fed to such chambers is heated by exhaust gases before being distributed to conduits conducting the charge to cylinders of the bank opposite that to which the chamber is immediately outboard. Moreover, the invention is directed to an arrangement of this character having an exhaust system and controls whereby the exhaust gases of an entire bank of cylinders may be directed to one hot spot without passage across the engine and the flow thereof is automatically controlled to control such flow to the hot spot at predetermined engine temperature.

An object of the invention is to provide an exhaust gas intake hot spot heating system including conduit means for conducting exhaust gases from an exhaust manifold to the hot spot and from the hot spot to the engine exhaust pipe, wherein heat responsive valve means is provided operable in one position for inhibiting flow of exhaust gases directly from the exhaust manifold to the engine exhaust pipe and in a second position to inhibit flow of exhaust gases from the connecting conduit means between hot spot and exhaust pipe to the exhaust pipe.

A further object is to provide a heating system as in the preceding object wherein the heat responsive valve means in said second position also inhibits flow of exhaust gases between said exhaust manifold and the connecting conduit means between exhaust manifold and hot spot.

An additional object is to provide an exhaust gas intake hot spot heating system including a first conduit means for conducting exhaust gases from an exhaust manifold to the hot spot, a second conduit means for conducting exhaust gases from the hot spot to an engine exhaust pipe connected with the exhaust manifold and wherein a heat responsive valve means is provided in said exhaust pipe above the connection of said second conduit means with the exhaust pipe for controlling flow between the manifold and exhaust pipe and wherein a second controllable valve means is provided in the first conduit means for controlling flow between the exhaust manifold and hot spot and which valve means may be interconnected such that one valve means is open when the other is closed.

Other objects and advantages of our invention will appear from the following description and from the drawings wherein:

FIGURE 1 is an elevational view partly in section of a V engine showing the intake hot spot heating system of the invention as applied thereto;

FIGURE 2 is a plan view of an eight cylinder engine of the V type shown in FIGURE 1 to which the invention is applied;

FIGURE 3 is an enlarged elevational view of a portion of the right hand bank of the engine of FIGURES 1 and 2 showing one form of the invention applied thereto;

FIGURE 4 is a similar view of the left hand bank;

FIGURE 5 is an elevational view of a portion of the right hand bank of FIGURE 1 showing a hot spot modification arranged to primarily heat the air-fuel mixture from the primary throttle of a four-barrel carburetor;

FIGURES 6 and 7 are side elevational views of the engine in FIGURE 4 showing modifications in the manner of controlling the exhaust gas flow; and FIGURE 8 shows a modification applicable to all the forms of the invention of FIGURES 1 to 7 wherein the hot spot is under the primary throttle only.

Referring now to the drawings wherein our invention has been illustrated as embodied in a V-8 engine provided with a long branch turnable intake system capable of dynamic charging by harmonic resonant tuning and by mass movement of air in the cylinders and wherein similar numerals are used to designate similar parts of the structure, FIGURE 1 shows a V engine having opposite banks 9 and 9a of cylinders 10 arranged at a suitable angle to each other and forming an angle of 90° to each other on a cylinder block 11, in FIGURE 1.

The cylinders 10 of each bank are preferably aligned longitudinally of the engine as schematically illustrated in FIGURE 2, with the cylinders of the opposite banks offset longitudinally relative to each other. For convenience of reference, the cylinders of the left hand cylinder bank 9 which is to the left looking forwardly from the flywheel end of the engine are numbered 1, 3, 5, and 7 starting such numbering at the opposite or fan end of the engine, and those of the right hand bank are numbered 2, 4, 6, and 8 respectively, these numerals appearing internally of the cylinder representations in FIGURE 2.

Secured to the block 11 are left and right cylinder heads 12 and 12a respectively, each provided with suitably shaped combustion chambers 13 shown to be of the wedge type, immediately above each cylinder 10. These may of course be of other shape for instance hemispherical.

Each cylinder has a piston 14, reciprocable therein and operably connected to a crankshaft 15 through a connecting rod 16 and wrist pin 17. Crankshaft 15 may be of any type, but will preferably be of the 90° type described in Patent No. 2,766,743 making possible various firing orders there described, for example, 1–8–4–3–6–5–7–2.

The combustion chambers or cavities 13 of the cylinders 10, are provided with a single inlet opening or port 20 closed by an inlet valve 22, and with a single smaller exhaust outlet or port 24 closed by an exhaust valve 26, these ports and valves as evident from FIGURE 2 being aligned longitudinally of the engine and as shown with the inlet ports of cylinders 1 and 3, 5 and 7, 2 and 4, and 6 and 8 in juxtaposition. Other valve arrangements such as shown in the patent are also contemplated. Each chamber is preferably fired by a single sparking means 27 projecting therein, as seen in FIGURE 1, and preferably located intermediate the valves 22 and 26.

The inlet and exhaust valves of both banks are preferably operable from a common camshaft 28 located above the crankshaft 15, it operating hydraulic tappets 30 and thereby the push rods 32 and 34 engaging the inlet and exhaust valve rocker arms 36 and 38 respectively. These actuate respectively the normally spring 40 held closed valves 22 and 26.

The cylinders of the opposite banks are fed with a combustion charge by a long branch carburetor fed intake system generally designated by the numeral 50 comprising a section 52 for feeding the left bank of cylinders having a mounting flange 54 by which it is secured through bolts 56 to the inner face 58 of the head 9 of the left bank and an independent separate substantially identical section 52a for feeding the right hand bank similarly secured by a flange and bolts to the inner face 60 of the right hand bank.

The section 52 comprises a plenum chamber or distribution box 62 whose inner compartment 64 is fed with air and fuel by a suitable carburetor 66 having any number of throats, two throats 68, 70 being shown coinciding with corresponding risers 72, 74 in the top face of the chamber 62 on which the carburetor is suitably mounted by bolts 76. The plenum chamber 62 is located outwardly beyond the right hand bank and generally below the top of the valve mechanism cover 78a of the head 12a. Extending in fan-like fashion from the plenum chamber 62, as seen in FIGURE 2, are a plurality of elongated conduits or passages, one for each cylinder of the left bank, four being shown for the V-8 engine here illustrated and numbered 80, 82, 84, and 86 which extend in pairs 80, 82, and 84, 86 in a generally smooth curve across the engine to connect with intake passages 88 of the cylinders 1, 3, 5, and 7 respectively, in the head 12 of the left bank, the latter passages starting at the face 58 and terminating at the inlet ports 20 of the cylinders 1, 3, 5, and 7 to make lengthy continuous passages between the plenum chamber 62 and these inlet ports.

The section 52a like the section 50 comprises a plenum chamber 62a located outwardly beyond the left hand bank 9 of the engine and generally below the top of the valve mechanism cover 78 of this bank. Like the section 52 this section also has extending from the plenum chamber 62a a plurality of elongated conduits or passages, one for each cylinder of the right hand bank numbered 80a, 82a, 84a, and 86a respectively, which extend in pairs 80a, 82a, and 84a, 86a in a generally smooth curve across the engine to connect with intake passages 88a of the cylinders 8, 6, 4, and 2 respectively, in the head 12a of the right hand bank, the later passages starting at the face 60 and terminating at the inlet ports 20 of the cylinders 8, 6, 4, and 2 respectively, to provide lengthy continuous passages between the plenum chamber 62a and these inlet ports. The plenum chamber 62a is provided with rises 72a, 74a which connect with corresponding throats of a dual carburetor 66a seated on this chamber. It will be noted that the paired conduits of the two sections 52 and 52a interlace and cross each other, as evident from FIGURES 1 and 2, to form a relatively compact arrangement in which the paired conduits 84, 86 lie intermediate the conduits 80a, 82a and 84a, 86a and the conduits 84a, 86a lie intermediate the conduits 80, 82 and 84, 86. In order to make this possible, the mounting flanges 54 of at least one of the sections 52, 52a for example that of the section 52, is split at the lines 90a, 92 to form a removable section 90b at the time of making assembly.

As seen in FIGURE 2, all of the conduits of each section lie in substantially the same plane in elevation and each open into their respective plenum chambers by separate apertures also located in the same general horizontal plane, as will be seen in FIGURE 2. Moreover, the plenum chambers 62, 62a are interconnected by a balance tube 91 whose ends open into the plenum chambers in the same plane as the conduits and which may for purposes of assembly be made of several sections interconnected with each other so as to provide stub ends on each of the plenum chambers.

In order to provide for rapid heating of the air-fuel mixture fed to the plenum chambers during cold starting, each of the plenum chambers is provided at the base thereof with a suitable hot spot exhaust gas heating box numbered 94a on the plenum chamber 62a, such boxes providing compartments 96 and 96a respectively, to which hot exhaust gases may be fed to heat the floors 98 and 98a of the plenum chamber compartments 64 and 64a respectively. It will be observed that in FIGURES 1 and 2, the hot spot heating boxes 94, 94a are substantially the full area of the base of the plenum chambers 62, 62a, respectively The left hand bank of the engine, as seen in FIGURES 1, 2, and 4, has secured to the outer face 100 of its head 12 an exhaust manifold generally designated by the numeral 102 and which comprises a runner or header section 104 provided with lateral branches 106 connecting the header with exhaust passages 108 forming continuations of the lateral branches 106 in the head 12 and terminating at the exhaust ports 24 in such head. The header 104 has a downwardly extending lateral branch conduit 110 located generally centrally of the header longitudinally of the engine and terminating in a flanged connection 112 with an exhaust pipe 114 which in turn connects with a muffler 116, all as seen in FIGURES 1 and 4.

The right hand bank of the engine, as seen in FIGURES 1, 2, and 3, has a similar exhaust manifold generally designated by the numeral 102a as in the case of the left hand exhaust manifold having lateral branches 106a connecting with the exhaust passages 108a of the head 12a of that bank . The manifold 102a also has a a downwardly directed lateral discharge branch 110a which, as shown in FIGURE 3, is located at the rearward end of the engine. It will be understood that this discharge branch may, if desired, be located similar to that of the manifold 102 in the mid region of the header 104a. The discharge conduit 110a also terminates in a flanged connection 112a with an exhaust pipe 114a connecting, as seen in FIGURE 1, with a muffler 116a.

It will be apparent from the above description of the exhaust manifold system that each bank has its own exhaust system to which the exhaust gases of all the cylinders of an entire bank are delivered and conducted away to a separate muffler. It will be understood, however, that the exhaust pipes 114 and 114a in FIGURE 1 may, if desired, be joined in a single pipe connected to a single muffler.

An important feature of the invention is the manner of conducting the exhaust gases from the exhaust manifolds to the intake manifold hot spot and controlling the inflow and discharge thereof from the hot spot. Thus as seen in FIGURES 1, 2, and 4, the hot spot 94a for the plenum chamber 62a of the intake section 52a feeding the cylinders 2, 4, 6, and 8 of the right hand bank is connected to the exhaust manifold system of the left hand bank by means of the conduits 120, 122.

As seen in FIGURES 1 and 4, the conduit 120 interconnects the compartment 96a of the hot spot 94a and the header 104 of the left hand exhaust manifold by an elbow conduit connection of suitable character which opens into the floor of the compartment 96a and into the exhaust manifold runner 104 at the outer upper side thereof intermediate the cylinders 5 and 7. The conduit 122 interconnects the compartment 96a of the hot spot 94a with the lateral conduit 110 of the exhaust manifold 102, as seen in FIGURES 1, 4, and 6, conduit 122 preferably opening into a side wall 124 of the hot spot 94a.

It will be noted that the connection of conduit 120 with the compartment 96a is at one end thereof, as seen in FIGURE 4, while the connection of the conduit 122 is at the opposite end thereof. Such an arrangement is preferred in order to facilitate movement of the exhaust gases entering the compartment 96a through the conduit 120 from the exhaust manifold to scrub across the floor 96a of the plenum chamber 62a and give up its heat thereto before discharging into the conduit 122.

A thermostatically controlled heat valve generally designated by the numeral 126, is provided in the discharge conduit 110 of the exhaust manifold 102 and arranged such that its throttle blade or valve 128 is movable with a rocker shaft 130 controlled by a metallic spring and counterweight, not shown, to move between two positions, one a horizontal position as shown in FIGURE 4 in the full lines closing off the passage in the conduit 110 between the exhaust pipe 114 and the exhaust header 104, and the second a vertical position shown in phantom in this figure closing off the connection of the conduit 122 with the conduit 110.

The right hand bank is provided with a similar interconnection between its exhaust system 102a and the hot spot 94 of the intake section 52 which feeds the left hand bank. Thus as seen in FIGURE 3, a conduit 120a similar to the conduit 120 of the left hand bank interconnects the heating compartment 96 of the hot spot 94 with the exhaust manifold header 104a, and a second conduit 122a interconnects this compartment 96 with the lateral conduit 110a of the exhaust manifold 102a immediately below a thermostatically controlled heat valve generally identified by the numeral 126a, whose throttle blade 128a and shaft 130a are operated between two positions, one a horizontal position, as shown in full lines wherein the blade 128a closes off connection between the header 104a and the exhaust pipe 114a, and a second vertical position shown in phantom wherein the blade 128a closes off the connection between the conduit 122a and the conduit 110a.

In operation of the hot spot heating system here described, the heat valves 126 and 126a will normally be in their position shown in FIGURES 3 and 4 closing off the conduits 110 and 110a from the exhaust pipes 114 and 114a respectively, when the engine is cold. When the engine is started and operating, the exhaust gases from the four cylinders of the left hand bank will be unable to discharge except by leakage out the conduit 110 and will instead flow through the conduit 120 upwardly into the heating compartment 96a across the floor 98a of the plenum chamber 62a and out the conduit 122 into the exhaust pipe 114. Similarly, the exhaust gases of the right hand bank will flow from the exhaust manifold 102a through the conduit 120a into the compartment 96, scrub the floor 98 of the plenum chamber 62 and flow out of the compartment 96 through the conduit 122a into the exhaust pipe 114.

During warmup of the engine the heat valves 126 and 126a will be positioned to provide optimum heating of the hot spot. This is usually the fully closed position of the valves as shown in FIGURES 3 and 4. However, it will be understood that the valves may be arranged for a partially open position during this operating cycle.

When the engine is fully warmed up and depending upon the vehicle operating conditions, the heat imparted to the control valves 126 and 126a from the exhaust manifolds and the air flow past the valves will control the positioning of the thermostats of the valves and blades 128, 128a and thereby determine the heat input to the hot spots 94 to give optimum operation of the engine. This may mean an intermediate open position or fully open position of the valves.

Referring to FIGURES 3 and 4, it will be observed that when the valves 126 and 126a will have moved their operating blades 128 and 128a respectively to the fully open position shown in phantom in FIGURES 3 and 4, that the exhaust gases of the four cylinders of each bank will flow from the manifolds directly out of their lateral conduits 110 and 110a respectively, into the exhaust pipes 114 and 114a respectively, with no flow except for slight leakage occurring between the exhaust manifolds of the banks and the heating compartments 96 and 96a of the plenum chamber hot spots. In this connection it will be noted that the exhaust gases may then flow into the compartment and through the connecting conduits but will be stopped by the throttle blades 128, 128a of the heat valves which close off the ends of the conduits 122 and 122a respectively.

Referring now to FIGURES 5 and 6 which show a modification of the structure of FIGURES 1-4 inclusive, it will be noted that as in FIGURES 3 and 4 the discharge pipe 122 extends between the hot spot 94 and the conduit 110 and has its end, which opens into the conduit 110, closed by the throttle blade of the heat valve. As previously stated, however, there may be a slight flow of exhaust gas due to leakage, in the arrangement of FIGURES 3 and 4 from the exhaust manifold through the hot spot and conduit 122 past the heat valve. In FIGURES 5 and 6 this leakage flow is more positively prevented by extending the conduit 120 between the hot spot 94 and a chamber 140 formed in the conduit 110 instead of having the conduit connect with the runner portion 104 of the exhaust manifold, as in FIGURE 4. It will be noted that the chamber 140 here is of substantially rectangular section having side walls 142, 144 and end walls 146, 148 as seen in FIGURE 6, a top wall 150 and a bottom wall 152, as seen in FIGURE 5. This chamber 140 except for the wall 144, forms a lateral extension of the circular conduit section 110.

As evident from FIGURE 6, the wall 144 reduces the normal circular section of the conduit 110 to a D shape, this wall 144 blending into the runner section of the manifold in the same manner as the remaining portion of the circular section with a smooth curve portion 154. As seen in FIGURE 5, the wall 144 preferably provides a lip 156 against which the throttle blade of the thermostatically controlled heat valve, generally designated by the numeral 158, and rotatable on a pin axis 160, may abut to close off the chamber 140 from the conduit 110. The throttled blade, as seen in FIGURE 5, has a portion 162 which in its horizontal position shown in FIGURE 5, extends across the open section of the conduit 110 and is similarly shaped to fill the same, and has a portion 164 which is a continuation of the portion 162 but on the opposite sides of the axis 160 which substantially abuts against the bottom wall 152 of the chamber 140.

In this position of the throttle blade 158, the exhaust gases emanating from the exhaust manifold through the conduit 110 will, instead of passing out through the exhaust pipe 114, be directed by the throttle blade into the chamber 140 and from there through the conduit 120 to the hot spot 94, then through the hot spot to the conduit 122 emptying into the conduit 110 below the throttle blade portion 162. Moreover, when the throttle blade 158 is in its vertical position shown in phantom in FIGURE 5, the portion 164 of the throttle blade will be seated against the lip 156 of the chamber 140 and the portion 162 will be seated against the flat wall portion 166 of the conduit 110 closing off the end of the conduit 122. In this position of the throttle blade it will be apparent that flow of exhaust gases to and from the hot spot is sealed off. Moreover, it will be observed that the lip 156 of chamber 140 projecting as it does within the circular section of the conduit 110 will direct the exhaust gases from the exhaust manifold past the chamber 140 and past the conduit 120. The throttle blade 158 will assist in this action. Manifestly, the modification in FIGURES 5 and 6 may be applied to both banks of the engine, that for the left ban only having been described above.

FIGURE 7 shows a further modification according to which flow of the hot exhaust gases to the hot spot 94 is controlled in the conduit 120 by a valve generally referred to by the numeral 170 and discharge of the gases to the exhaust pipe 114 through the conduit 110 is preferably controlled by a conventional heat responsive butterfly valve generally designated by the numeral 172. When the blade 171 of valve 170 is open, as shown, the gases may flow through the conduit 120 into the hot spot 94 out through the conduit 122 and into the exhaust conduit 110 below the valve 172 which at this time will have its blade 172a in closed position. On the other hand, when the blade 171 of the valve 170 is closed, flow of exhaust gases between the exhaust manifold and hot spot 94 through the conduit 120 will be inhibited and the exhaust gases will be directly discharged into the exhaust conduit 110 from the exhaust manifold past the blade 172a of valve 172 which is then in open position.

It will be understood that the valves 170 and 172 may each be thermostatically controlled independently of each other by conventional bimetallic heat responsive spring elements 172b (see FIG. 6). Preferably, however, the valve 172 will be thermostatically controlled and a linkage connection generally designated by the numeral 172c, provided between the valves 170 and 172 such that when the valve 170 is open, the valve 172 will be closed and vice versa when the valve 170 is closed, the valve 172 will be open. This linkage will generally comprise a lever 173 fixed to the shaft extension 174 of the throttle blade 171 of valve 170, a second lever 175 fixed to the shaft extension 176 of the blade 172a of the valve 172 and a link 176 pivotally connecting the ends of these levers which are positioned as shown in FIGURE 7. A feature of the invention is the provision of a lost motion connection between the operating arm or lever 173 for the valve 170 and the valve whereby it is possible to adjust the butterfly 171 of the valve 170 to any prefixed relation in the conduit 120 so as to control the quantity of exhaust gases flowing to the hot spot while at the same time providing a means for completely closing off flow of gas between the exhaust manifold and the hot spot. For effecting this result the lever 173 is made loose on the shaft 174 and a second lever or arm 177 is fixed to shaft 174. One of the lever 173, 177, preferably the lever 173, is provided as shown with a transversely extending adjustment screw 178 threadedly received into a suitable portion 179 of the lever 173 and which may abut the lever 177 and which is adjusted to provide a predetermined angular relation between the two levers. A lock nut 179a may be provided to fix the screw 178. To maintain the abutment and permit concurrent movement of the levers, a tension spring 180 extends between tabs 181 and 182 of the levers 173 and 177 respectively.

It will be apparent that normally any motion imparted to the lever 173 by the lever 175 will be transmitted to the lever 177 through the screw 178 or spring 180 as the case may be. Moreover that with the valve 170 in a partially closed preset position, it is possible for the lever 173 to continue its angular movement in response to operation of lever 175 even after blade 171 is in the fully closed position of valve 170, such being made possible by the spring 180. Where desired, the heat valve 172 may be replaced by one similar to the heat valve 126, as shown in FIGURES 3 and 4, whereby the apertured end of the conduit 122 in the conduit 110 will be closed off when the valve 172 is open. Such will prevent any rearward flow of exhaust gas from the conduit 110 into the hot spot 94. Obviously the modification in FIGURE 7 may also be applied to both banks of the engine.

FIGURE 8 illustrates a modification of an arrangement similar to that in FIGURES 3 and 4 employing, however, a conventional heat valve wherein the hot spot instead of extending completely across the base of the plenum chamber 62, provides a hot spot 180 only directly below the primary throttle portion 70 of the carburetor, this providing a means in certain cases of preventing overheating of the floor of the plenum chamber. Manifestly, this feature may also be applied to the constructions in FIGURES 1–7 inclusive.

Although the features of our invention have been described with respect to a V engine, it will be understood that the same are applicable to a line engine and to engines of any number of cylinders and such will be apparent to those skilled in the art. Accordingly all such modifications coming within the intent and spirit of our invention as expressed in the appended claims is contemplated.

We claim:

1. In an engine including an intake manifold provided with a hot spot for heating a fuel charge passing through said intake manifold, an exhaust gas heating system for said hot spot comprising an exhaust manifold for receiving hot exhaust gases from the engine cylinders, said exhaust manifold being completely displaced from said hot spot of said intake manifold, discharge conduit means for conducting exhaust gases from said exhaust manifold, a second conduit means interconnecting said hot spot with one of said exhaust manifold and discharge conduit means for conducting exhaust gas to said hot spot, a third conduit means spaced apart from said second conduit means interconnecting said hot spot with said discharge conduit means for conducting exhaust gas from said hot spot to said discharge conduit means, and valve means in said discharge conduit means operable in one position to permit free flow of exhaust gas from said exhaust manifold through said discharge conduit means, and blocking flow from said third conduit means to said discharge conduit means and operable in a second position to block free flow of exhaust gas from said exhaust manifold through said discharge conduit means and permit free flow of gas from said third conduit means to said discharge conduit means.

2. In an engine including an intake manifold provided with a hot spot for heating a fuel charge passing through said intake manifold, an exhaust gas heating system for said hot spot comprising an exhaust manifold for receiving hot exhaust gases from the engine cylinders, said exhaust manifold being completely displaced from said hot spot of said intake manifold, discharge conduit means for conducting exhaust gases from said exhaust manifold, a second conduit means interconnecting said hot spot with said exhaust manifold for conducting exhaust gas to said hot spot, a third conduit means interconnecting said hot spot with said discharge conduit means for conducting exhaust gas from said hot spot to said discharge conduit means, and valve means in said discharge conduit means operable in one position to permit free flow of exhaust gas from said exhaust manifold through said discharge conduit means, and blocking flow from said third conduit means to said discharge conduit means and operable in a second position to block free flow of exhaust gas from said exhaust manifold through said discharge conduit means and permit free flow of gas from said third conduit means to said discharge conduit means.

3. In an engine including an intake manifold provided with a hot spot for heating a fuel charge passing through said intake manifold, an exhaust gas heating system for said hot spot comprising an exhaust manifold for receiving hot exhaust gases from the engine cylinders, said exhaust manifold being completely displaced from said hot spot of said intake manifold, discharge conduit means for conducting exhaust gases from said exhaust manifold, a second conduit means interconnecting said hot spot with said discharge conduit means for conducting exhaust gas to said hot spot and including a chamber at the connection thereof with said discharge conduit means having a wall portion forming a restriction in said latter conduit, a third conduit means interconnecting said hot spot with said discharge conduit means for conducting exhaust gas from said hot spot to said discharge conduit means, and valve means in said discharge conduit means operable in one position to permit free flow of exhaust gas from said exhaust manifold through said discharge conduit means, and blocking flow from said third conduit means to said discharge conduit means and operable in a second position to block free flow of exhaust gas from said exhaust manifold through said discharge conduit means and permit free flow of gas from said third conduit means to said discharge conduit means.

4. A heating system as claimed in claim 1 wherein said valve means is a heat responsive valve means.

5. In an engine including an intake manifold provided with a hot spot for heating a fuel charge passing through said manifold, an exhaust gas heating system for said hot spot comprising an exhaust manifold for receiving hot exhaust gas from the engine cylinders, said exhaust manifold being completely displaced from said hot spot of said intake manifold, an outlet conduit connecting with said exhaust manifold, an exhaust pipe connecting with said outlet conduit, a second conduit interconnecting the hot spot with said exhaust manifold, a third conduit interconnecting said hot spot and said outlet conduit and a heat response valve in said outlet conduit including a throttle blade, said blade being operable in one position to inhibit flow of exhaust gas between said exhaust manifold and said exhaust pipe but permit flow thereof between said hot spot and said exhaust pipe through said third conduit, and in a second position permit flow of exhaust gas between said exhaust manifold and exhaust pipe but inhibit flow of exhaust gases between said hot spot and said exhaust pipe.

6. A heating system as claimed in claim 4 wherein said heat responsive valve means is controlled by a bimetallic element.

7. In an engine including an intake manifold provided with a hot spot for heating a fuel charge passing through said intake manifold, an exhaust gas heating system for said hot spot comprising an exhaust manifold for receiving hot exhaust gas from the engine cylinders, said exhaust manifold being completely displaced from said hot spot of said intake manifold, discharge conduit means for conducting exhaust gas from said exhaust manifold, a second conduit means interconnecting said hot spot with said exhaust manifold for conducting exhaust gas to said hot spot, a third conduit means interconnecting said hot spot and said discharge conduit means for conducting exhaust gas from said hot spot to said discharge conduit means, said third conduit means having an outlet opening into said discharge conduit means, and valve means including a swingable blade pivotally mounted in said discharge conduit means adjacent said outlet opening at one side of said discharge conduit means, said blade being operable to a position extending transversely of said discharge conduit means and wherein it substantially fills the section of said discharge conduit means and to a position extending in the lengthwise direction of said discharge conduit means wherein it closes said outlet opening.

8. In an engine including an intake manifold provided with a hot spot for heating a fuel charge passing through said intake manifold, an exhaust gas heating system for heating said hot spot comprising an exhaust manifold for receiving hot exhaust gases from the engine cylinders, said exhaust manifold being completely displaced from said hot spot of said intake manifold, discharge conduit means connecting with said exhaust manifold and defining a passage for conducting exhaust gases away from said exhaust manifold, a side structure on said discharge conduit means defining a side chamber having an aperture opening into said passage, a second conduit means connecting said hot spot with said side chamber, a third conduit means interconnecting said hot spot with said discharge conduit means and valve means operable in said passage and side chamber, said valve means being operable in one position to shunt flow of exhaust gas entering said discharge conduit means into said chamber for flow to said second conduit means and operable in a second position to close said aperture and permit flow of exhaust gas through said discharge conduit means substantially unrestricted by said valve means.

9. In an engine including an intake manifold provided with a hot spot for heating a fuel charge passing through said intake manifold, an exhaust gas heating system for heating said hot spot comprising an exhaust manifold for receiving hot exhaust gases from the engine cylinders, said exhaust manifold being completely displaced from said hot spot of said intake manifold, discharge conduit means connecting with said exhaust manifold and defining a passage for conducting exhaust gases away from said exhaust manifold, a side structure on said discharge conduit means defining a side chamber having an aperture opening into said passage, a second conduit means connecting said hot spot with said side chamber, valve means operable in said passage and side chamber, said valve means being operable in one position to shunt flow of exhaust gas entering said discharge conduit means into said chamber for flow to said second conduit means and operable in a second position to close said aperture and permit flow of exhaust gas through said discharge conduit means substantially unrestricted by said valve means, and a third conduit means interconnecting said hot spot and discharge conduit means and opening into the latter below the said one position of said valve means.

10. In an engine including an intake manifold provided with a hot spot for heating a fuel charge passing through said intake manifold, an exhaust gas heating system for heating said hot spot comprising an exhaust manifold for receiving hot exhaust gases from the engine cylinders, said exhaust manifold being completely displaced from said hot spot of said intake manifold, discharge conduit means connecting with said exhaust manifold and defining a passage for conducting exhaust gases away from said exhaust manifold, a side structure on said discharge conduit means defining a side chamber having an aperture opening into said passage, a second conduit means connecting said hot spot with said side chamber, a third conduit means interconnecting said hot spot and discharge conduit means for conducting exhaust gas from said hot spot to said discharge conduit means and defining a second aperture opening into said passage, and valve means operable in said passage and side chamber, said valve means being operable in one position to shunt flow of exhaust gas entering said discharge conduit means into said chamber for flow to said second conduit means and operable in a second position to close both said apertures aforesaid and permit flow of exhaust gas through said discharge conduit means substantially unrestricted by said valve means.

11. In an engine including an intake manifold provided with a hot spot for heating a fuel charge passing through said intake manifold, an exhaust gas heating system for said hot spot comprising an exhaust manifold for receiving hot exhaust gases from the engine cylinders, said exhaust manifold being completely displaced from said hot spot of said intake manifold, discharge conduit means for conducting exhaust gases from said exhaust manifold, a second conduit means interconnecting said hot spot with one of said exhaust manifold and discharge conduit means for conducting exhaust gas to said hot spot, a third conduit means interconnecting said hot spot with said discharge conduit means for conducting exhaust gas from said hot spot to said discharge conduit means, valve means in said second conduit means for controlling flow of exhaust gas to said hot spot and valve means in said discharge conduit means above the connection of said third conduit means therewith for controlling flow of said exhaust gas through said discharge conduit means from said exhaust manifold means including a lost-motion connection operably interconnecting said two aforesaid valve means.

12. A heating system as claimed in claim 11 wherein one of said valve means is open when the other is closed.

13. A heating system as claimed in claim 11 wherein both of said valve means are independently heat responsive in operation.

14. A heating system as claimed in claim 11 wherein said two valve means are interconnected by an operating linkage adapted to effect simultaneous operation of both valves and said lost-motion connection is between said linkage and said first mentioned valve means.

15. A heating system as claimed in claim 11 wherein said first mentioned valve means is adjustable to control the quantity of exhaust gas flowing to said hot spot when said valve is open.

16. In an engine, an intake manifold, a carburetor for feeding a charge of fuel and air to said manifold, said carburetor having primary and secondary throat feeding means, a distribution chamber on said intake manifold having intake riser means substantially aligned with said throat feeding means through which to direct flow of the charge to said chamber, a hot spot on said manifold below said chamber and feeding means and extending over at least that portion of said chamber below said riser means aligned with said primary feeding means for heating the fuel charge passing through said chamber from at least said primary feeding means and an exhaust gas heating system for said hot spot comprising an exhaust manifold completely displaced from said hot spot for receiving hot exhaust gases from the engine cylinders, discharge conduit means for conducting exhaust gases from said exhaust manifold, a second conduit means interconnecting said hot spot with one of said exhaust manifold and discharge conduit means for conducting exhaust gas to said hot spot, a third conduit means spaced apart from said second conduit means interconnecting said hot spot with said discharge conduit means for conducting exhaust gas from said hot spot to said discharge conduit means and valve means in said discharge conduit means operable in one position to permit free flow of exhaust gas from said exhaust manifold through said discharge conduit means, and operable in a second position to block free flow of exhaust gas from said exhaust manifold through said discharge conduit means and permit free flow of exhaust gas through said second conduit means to said hot spot and from the latter through said third conduit means to said discharge conduit means.

17. An engine structure as claimed in claim 16 wherein said hot spot extends over the full base area of said distribution chamber.

18. An engine structure as claimed in claim 16 wherein said hot spot extends over only that portion of the base area of the distribution chamber immediately below said primary riser means.

19. In an engine, an intake manifold, a carburetor for feeding a charge of fuel and air to said manifold, said carburetor having primary and secondary throat feeding means, a distribution chamber on said intake manifold having intake riser means substantially aligned with said throat feeding means through which to direct flow of the charge to said chamber, a hot spot on said manifold below said chamber for heating the fuel charge passing through said chamber and an exhaust gas heating system for said hot spot comprising an exhaust manifold completely displaced from said hot spot for receiving hot exhaust gases from the engine cylinders, discharge conduit means for conducting exhaust gases from said exhaust manifold, a second conduit means interconnecting said hot spot with one of said exhaust manifold and discharge conduit means for conducting exhaust gas to said hot spot, a third conduit means interconnecting said hot spot with said discharge conduit means for conducting exhaust gas from said hot spot to said discharge conduit means and valve means in said discharge conduit means operable in one position to permit free flow of exhaust gas from said exhaust manifold through said discharge conduit means, and blocking flow from said third conduit means to said discharge conduit means and operable in a second position to block free flow of exhaust gas from said exhaust manifold through said discharge conduit means and permit free flow of gas from said third conduit means to said discharge conduit means, said hot spot extending over only that portion of the base area of the distribution chamber immediately below said primary throat feeding means.

References Cited in the file of this patent

UNITED STATES PATENTS

| | | |
|---|---|---|
| 1,605,382 | Wirrer | Nov. 2, 1926 |
| 1,643,957 | Redmond | Oct. 4, 1927 |
| 1,749,246 | Francis | Mar. 4, 1930 |
| 1,889,270 | Thomas et al. | Nov. 29, 1932 |
| 1,896,085 | Holley | Feb. 7, 1933 |
| 2,002,049 | Waseige | May 21, 1935 |
| 2,014,317 | Fedden et al. | Sept. 10, 1935 |
| 2,068,952 | Heitger | Jan. 26, 1937 |
| 2,121,529 | Moore | June 21, 1938 |
| 2,196,330 | Chandler | Apr. 9, 1940 |
| 2,294,326 | Wirth | Aug. 25, 1942 |
| 2,434,192 | Braun | Jan. 6, 1948 |
| 2,437,724 | Brown | Mar. 16, 1948 |
| 2,722,203 | Drinkard et al. | Nov. 1, 1955 |
| 2,862,490 | Trisler | Dec. 2, 1958 |